(12) United States Patent
Shimatani et al.

(10) Patent No.: US 8,142,894 B2
(45) Date of Patent: Mar. 27, 2012

(54) LAMINATED GLASS AND LAMINATED GLASS MEMBER

(75) Inventors: Narutoshi Shimatani, Otsu (JP); Seiji Hamada, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 12/679,531

(22) PCT Filed: Sep. 25, 2008

(86) PCT No.: PCT/JP2008/067288
§ 371 (c)(1),
(2), (4) Date: Mar. 26, 2010

(87) PCT Pub. No.: WO2009/041491
PCT Pub. Date: Apr. 2, 2009

(65) Prior Publication Data
US 2010/0209648 A1    Aug. 19, 2010

(30) Foreign Application Priority Data
Sep. 27, 2007    (JP) .................................. 2007-250853

(51) Int. Cl.
*B32B 17/06* (2006.01)
(52) U.S. Cl. ........ 428/426; 428/430; 428/435; 428/437; 428/441
(58) Field of Classification Search .................. 428/426, 428/430, 435, 437, 441
See application file for complete search history.

(56) References Cited

U.S. PATENT DOCUMENTS

| | | | | |
|---|---|---|---|---|
| 4,130,684 A | * | 12/1978 | Littell et al. | .................. 428/212 |
| 5,567,529 A | * | 10/1996 | Smith | ........................ 428/425.6 |
| 6,733,872 B2 | | 5/2004 | Nagai | |
| 2002/0150744 A1 | | 10/2002 | Nagai | |
| 2003/0162028 A1 | * | 8/2003 | Friedman et al. | ............. 428/421 |
| 2004/0157048 A1 | | 8/2004 | Nagai | |

(Continued)

FOREIGN PATENT DOCUMENTS

EP    2 062 862    5/2009
(Continued)

OTHER PUBLICATIONS

International Preliminary Report on Patentability and Written Opinion of the International Searching Authority issued May 14, 2010 in International (PCT) Application No. PCT/JP2008/067288.

(Continued)

*Primary Examiner* — Jennifer McNeil
*Assistant Examiner* — Lauren Robinson
(74) *Attorney, Agent, or Firm* — Wenderoth, Lind & Ponack, L.L.P.

(57) ABSTRACT

A laminated glass (10) has a structure in which seven sheet glasses (20) and six PVB resin layers (30) are laminated alternately. A laminated region from a transparent surface (10a) on one side to 4.0 mm comprises two 0.7 mm-thick glass layers formed of two sheet glasses (20), one 0.8 mm-thick glass layer formed of the portion (20c) of one 1.5 mm-thick sheet glass (20) positioned in the laminated region, and two adhesion layers (30) with thicknesses of 1.3 mm and 0.5 mm. Each of the adhesion layers is interposed between the glass layers and is adhered to the glass layers. The laminated region with a depth of 4.0 mm from a transparent surface (10b) on the other side also has the same laminated structure as that in the above laminated region.

20 Claims, 4 Drawing Sheets

U.S. PATENT DOCUMENTS

2009/0311497 A1* 12/2009 Aoki .............................. 428/214
2010/0028585 A1 2/2010 Shimatani

FOREIGN PATENT DOCUMENTS

| JP | 07-101755 | 4/1995 |
| JP | 07-206483 | 8/1995 |
| JP | 09-030846 | 2/1997 |
| JP | 11-236252 | 8/1999 |
| JP | 2002-326847 | 11/2002 |
| JP | 2003-192402 | 7/2003 |
| JP | 2004-196559 | 7/2004 |
| JP | 2009-001478 | 1/2009 |
| JP | 2009-7243 | 1/2009 |
| WO | WO-03068501 * | 8/2003 |
| WO | 2008/032781 | 3/2008 |

OTHER PUBLICATIONS

International Search Report issued Oct. 28, 2008 in International (PCT) Application No. PCT/JP2008/067288.

Japanese Office Action (together with partial English translation) mailed Feb. 1, 2012 in corresponding Japanese Patent Application No. 2008-246554.

* cited by examiner

LAMINATED GLASS AND LAMINATED GLASS MEMBER

TECHNICAL FIELD

The present invention relates to a laminated glass for constituting a window member used for buildings, vehicles, and the like, and a laminated glass member using the laminated glass.

BACKGROUND ART

A laminated glass generally has a structure in which a resin is sandwiched between two inorganic glass sheets, and a number of laminated glasses are used as window members for buildings, automobiles, railway vehicles, and the like. Compared with a general window glass in a single sheet form, the laminated glass is excellent in strength and toughness in a glass surface and has durability against an external force, and hence, destruction and penetration are unlikely to occur. Due to such performances, the laminated glass is useful as a window member that requires security and safety. The laminated glass may exhibit various performances by selecting a material of a resin. Therefore, a novel resin has been studied, and a laminated glass, which is excellent in various additional performances, such as acoustic insulation and heat insulation, has been realized.

As described above, the laminated glass are installed on a large number of buildings, automobiles, and the like, and many inventions have been made for further enhancement of the performance and quality thereof. For example, Patent Document 1 discloses a laminated glass, glass fragments of which hardly scatter at the time of breakage, and which is excellent in acoustic insulation. This prior art involves using two kinds of polyvinyl acetal resin films, to thereby prevent the acoustic insulation from being lowered, caused by a coincidence effect. The coincidence effect refers to a phenomenon that, when a sound wave enters the glass, a transverse wave is transmitted on a glass surface due to stiffness and inertia of the glass, and the transverse wave and the incident sound resonate to cause transmission of a sound. Patent Document 2 discloses a laminated glass which is excellent in impact resistance and delamination resistance with respect to incoming flying substances and the like. This prior art involves inserting laminated intermediate films made of two or more kinds of resins having different Young's moduli between glass sheets to achieve tight integration. Patent Document 3 discloses a safety laminated glass, scattering of which is unlikely to occur even when the glass is broken by an external force. This prior art involves mixing an organic peroxide and a silane coupling agent in an ionomer resin in which molecules of ethylene-methacrylic acid copolymers are bonded by metal ions, inserting a thermosetting resin thus obtained between glass sheets, and achieving their integration by heat curing. Patent Document 4 discloses a laminated glass, glass fragments of which do not scatter even when the glass is broken. This prior art involves injecting a polymerizable composition containing polycarbonate, pentaerythritol tetra (3-mercaptopropionate), and a photopolymerization initiator between two glasses, and curing the resins by photopolymerization to form a resin layer.

Patent Document 1: JP 07-206483 A
Patent Document 2: JP 2003-192402 A
Patent Document 3: JP 09-30846 A
Patent Document 4: JP 11-236252 A

DISCLOSURE OF THE INVENTION

Problems to be Solved by the Invention

However, laminated glass are currently required to have further enhanced functions. Thus, only the prior arts having been made conventionally are insufficient by only themselves. For example, a laminated glass is used for a window panel material for a high-rise building in view of the necessity of resistance to wind. However, when the laminated glass used in such high-rise building is destroyed due to an impact or the like caused by earthquake, an incoming flying substance, or the like, crushed materials may fall down onto road surfaces in a large amount. At this time, large glass fragments fall down and hit people walking on the road or people who have evacuated from the indoor to the road, which is very dangerous. Further, it is desired that a window panel material for a high-rise building be light, but the current laminated glass are insufficient in terms of cares at this point. On the other hand, there is also a problem in an application of the laminated glass to a low-rise construction that is not a high-rise building. For example, if the laminated glass is used in a welfare facility, a medical-related facility, or the like, a laminated glass having an appropriate strength against smashing, thrusting, or the like may be available. However, when the laminated glass is once destroyed with a large impact, large sharp glass fragments are generated, resulting in a risk of causing a cut wound disaster, or the like.

Patent Documents 1 to 4 each disclose a laminated glass, the glass fragments of which do not scatter or hardly scatter even if the laminated glass is broken. However, any of these prior arts relates to the improvement of a material for a resin layer forming the laminated glass, and does not pay attention to a sheet glass forming the laminated glass. Further, the laminated glass of any of the prior arts cannot avoid the generation of large glass fragments at the time of breakage.

In view of the above situation, an object of the present invention is to provide a laminated glass having advantages in that the laminated glass has excellent impact resistance, and moreover, even when the laminated glass is destroyed due to application of a load exceeding strength of the laminated glass, scattered glass fragments are small in size and in generation amount. Another object of the present invention is to provide a light-weight laminated glass member that can prevent damages such as a bruise and a cut wound, caused by scattering of the glass fragments generated by the destruction of a building such as a high-rise building.

Means for Solving the Problems

The inventors of the present invention have earnestly studied the structure of a laminated glass that prevents a bruise and a cut wound caused by glass fragments, in addition to mechanical strength of the glass such as impact resistance and penetration resistance, and searched for a method thereof. Then, the inventors have paid attention to the respect that, even if a laminated glass is destroyed, when the size of scattered glass fragments is minute and the generation amount thereof is small, the occurrence of secondary injuries and disasters such as a cut wound and a bruise caused by the incoming flying of the glass fragments can be suppressed. Consequently, the inventors of the present invention have found for the first time that it is possible to achieve the objects by contriving the thickness, arrangement, and laminated structure of glass layers forming the laminated glass, thereby providing the present invention.

That is, a laminated glass of the present invention is a laminated glass, comprising multiple glass layers and multiple adhesion layers, each of the glass layers and the adhesion layers being laminated together alternately, in which a laminated region with a depth of 4.0 mm from at least one of front and back transparent surfaces opposite to each other in a thickness direction of the laminated glass is formed of multiple adhesion layers and multiple glass layers with a thickness of less than 1.0 mm.

The laminated glass of the present invention has a structure in which multiple glass layers and adhesion layers are laminated alternately, and all the thicknesses of the glass layers forming the laminated region with the depth of 4.0 mm from at least one of front and back transparent surfaces are less than 1.0 mm. Here, each "glass layer" in the present invention is typically formed of one sheet glass, but the glass layer positioned on the innermost layer side in the laminated region may be formed of a part of one sheet glass in some cases. In this case, the end of inner layer side of the sheet glass is positioned on a more inner layer side than the boundary of the laminated region (position at the depth of 4.0 mm), and the portion positioned in the laminated region of the sheet glass functions as a "glass layer" defined in the present invention.

In the present invention, the kind of glass layers (sheet glasses) constituting the laminated glass is not particularly limited. That is, there can be used various glass materials such as soda lime glass, lead glass, alkali-free glass, quartz glass, aluminosilicate glass, borosilicate glass, phosphate glass, tellurite glass, titanate glass, fluoride glass, and lithium silicate glass. Each sheet glass used in the present invention may or may not be made of the same material. The number of sheet glasses to be used is not limited as long as the conditions of the laminated region defined in the present invention are satisfied. The thickness of each sheet glass may or may not be the same. It should be noted that if it is desired that more stable strength performance be exhibited, the structure in which substantially 5 or more sheet glasses are laminated is more preferred.

During the survey of the safety of a laminated glass at the time of its breakage, the inventors of the present invention first found that, in order to decrease the size of scattered glass fragments of a sheet glass at the time of its destruction to thereby reduce the generation amount of the sheet glass, it was effective to form each of the transparent surfaces of the laminated glass with a glass layer having a small thickness. However, even if taking only the foregoing into consideration, in the case where the laminated glass was destroyed, the glass fragments of a glass layer placed on a more inner layer side than the transparent surface of the laminated glass might be scattered outward at the time of breakage, and hence, there remained a problem in terms of safety. The inventors of the present invention carried out another survey so as to solve the problem, and have found that, when a glass layer with a small thickness is placed in a region in the vicinity of a transparent surface of a laminated glass, in particular, in a region (laminated region) with a depth of 4.0 mm from the transparent surface, the glass fragments of a glass layer of the transparent surface and the glass fragments of glass layers in the region near the transparent surface can be prevented from scattering, and the scattering of glass fragments of glass layers placed on a more inner layer side than the laminated region can also be prevented.

Any material can be used for the adhesion layer of the laminated glass of the present invention as long as the material effectively contributes to the adhesion of glass layers and desired optical performance can be obtained. Examples of the material that may be appropriately selected for use include: inorganic adhesives such as liquid glass; and organic synthetic resin-based adhesives such as an acrylic (or methacrylic) resin, an olefin-based resin, a urethane resin, an ether-based resin, an epoxy-based resin, a vinyl acetate-based resin, an aqueous polymer-isocyanate-based resin, a styrene-butadiene rubber solution-based resin, a silicone-based resin, a polyimide-based resin, a phenol-based resin, a melamine-based resin, a polyvinyl-based resin, a nitro-based resin, a cyanoacrylate-based resin, a vinyl chloride-based resin, and a chloroprene rubber-based resin.

The adhesion layer of the laminated glass of the present invention may have a structure in which multiple layer-like substances are laminated. Further, a net-like substance or the like of a metal, a resin, or a glass fiber and a carbon fiber may be interposed in the adhesion layer.

Further, in the laminated glass of the present invention, it is preferred that the main component of the adhesion layer be a resin in addition to the foregoing, because adhesiveness with sheet glass can be easily enhanced and the glass fragments of sheet glass can be effectively prevented from scattering.

"The main component of the adhesion layer is a resin" refers to the fact that 50 mass % or more of the adhesion layer are formed of resin components. The form of mixture of the resin in the adhesion layer may be or may not be homogeneous or heterogeneous. Even for heterogeneous mixture, any form of mixture is applicable and any of such forms as a liquid form, a paste form, a jelly form, a fiber form, a slice form, a powdery form, a granular form, and a tape form may be applied.

Various materials can be added to the resin for adjustment of performance. For example, a polymerization accelerator, an antioxidant, a polymerization inhibitor, a viscosity regulator, or a dehumidifying agent may be used in an appropriate amount, if necessary.

In the laminated glass of the present invention, in addition to the foregoing, when a value obtained by subtracting, from a total value of thicknesses of all the glass layers in the laminated region, a thickness of the glass layer positioned on the outermost layer side in the laminated region, and a thickness of the glass layer positioned on the innermost layer side in the laminated region when the glass layer on the innermost layer side is formed of a part of one sheet glass, is 0.5 mm or more, glass fragments generated in a more inner side than the above laminated region at the time of breakage of the laminated glass can be effectively prevented from sticking out of a transparent surface or from scattering outside.

Taking a laminated glass 11 shown in FIG. 1A of an embodiment and a laminated glass 12 shown in FIG. 1B of an embodiment for example, the foregoing is described.

First, in the laminated glass 11 shown in FIG. 1A, in the laminated region having a depth of 4 mm from a transparent surface 11a, three glass layers with thicknesses of 0.5 mm, 0.5 mm, and 0.6 mm respectively, are provided in the stated order from the side of the transparent surface 11a. The glass layer with a thickness of 0.6 mm and being positioned on the innermost layer side is formed of a part of a sheet glass with a thickness of 3.0 mm (portion positioned in the above laminated region). In this case, the sum of thicknesses of all glass layers in the above laminated region is 0.5 mm+0.5 mm+0.6 mm=1.6 mm. The thickness of the glass layer positioned on the outermost layer side in the above laminated region is 0.5 mm. The thickness of the glass layer positioned on the innermost layer side in the above laminated region is 0.6 mm. Thus, the laminated glass 11 satisfies the condition of 1.6 mm−(0.5 mm+0.6 mm)=0.5 mm≧0.5 mm.

Next, in the laminated glass 12 shown in FIG. 1B, in the laminated region with a depth of 4.0 mm from a transparent surface 12a, three glass layers with thicknesses of 0.7 mm, 0.5 mm, and 0.7 mm respectively, are provided in the stated order from the side of the transparent surface 12a. The glass layer positioned on the innermost layer side is formed of a whole of one sheet glass like the other glass layers. In this case, the sum of thicknesses of all glass layers in the above laminated region is 0.7 mm+0.5 mm+0.7 mm=1.9 mm. The thickness of the glass layer positioned on the outermost layer side in the above laminated region is 0.7 mm (the thickness of the glass layer positioned on the innermost layer side in the above laminated region is not counted). Thus, the laminated glass 12 satisfies the condition of 1.9 mm−0.7 mm=1.2 mm≧0.5 mm.

In the present invention, the thickness of the laminated glass and the thickness of the glass layer may be measured by using a sizer such as a calibrated vernier caliper or a calibrated microscope with a microgauge.

Further, if in the laminated glass of the present invention, in addition to the foregoing, front and back transparent surfaces are each formed of a glass layer, advantages of glass such as surface gloss and flaw resistance can be effectively used for the applications such as a window member. In particular, when the glass layer is made of alkali-free glass, the glass layer has high chemical durability and weather resistance, and hence, the laminated glass can be used in a severe environment, which suggests wider applications.

The composition of the alkali-free glass is arbitrary as long as the composition is capable of providing desired mechanical properties, weather resistance, and surface smoothness to the glass layer. In particular, the alkali-free glass contains preferably 60% or more of $SiO_2+B_2O_3$ and 1% or less of $Na_2O+K_2O+Li_2O$ and further contains more preferably 1 to 25% of $Al_2O_3$ and 2 to 30% of RO (R=Mg+Ca+Sr+Ba+Zn) in terms of oxides expressed by mass %. Further, in terms of facilitating the stable control of production conditions in a suitable range, the composition is preferably set to 60 to 80% of $SiO_2+B_2O_3$ and 5 to 20% of $Al_2O_3$ in the above composition range. As glass having such a preferred composition, for example, there are thin sheet glasses (article code: OA-10, OA-21) to be mounted on a liquid crystal display apparatus, the glasses being produced by Nippon Electric Glass Co., Ltd.

When the laminated glass of the present invention has the above-mentioned laminated region with a laminated structure on each side of the front and back transparent surfaces, safety of the front and back surfaces can be secured at the time of breakage. Further, when the laminated structure of the laminated region of the front and back surfaces is plane-symmetrical with respect to the central plane of the laminated glass in the thickness direction, there is no need for distinguishing the front and the back, and hence, the laminated glass can be installed without considering which the front and the back are when the installation is performed, and the materials can be simply handled.

In the laminated glass of the present invention, it is preferred that the adhesion layer be formed of a thermoplastic resin in addition to the foregoing, because adhesiveness with sheet glass can be easily enhanced and the glass fragments of sheet glass can be effectively prevented from scattering.

Any material can be used for the thermoplastic resin as long as the material has desired performance, and can achieve sufficiently high visible light transmittance when being laminated with sheet glass. Examples thereof include polypropylene (PP), polystyrene (PS), cellulose acetate (CA), a diallyl phthalate resin (DAP), an ethylene vinyl acetate copolymer (EVA), polyethylene (PE), polybutylene terephthalate (PBT), polyvinyl butyral (PVB), polyvinyl formal (PVF), polyvinyl alcohol (PVAL), a methacrylic resin (PMA), polyvinyl chloride (PVC), polyethylene terephthalate (PET), a urea resin (UP), a melamine resin (MF), unsaturated polyester (UP), a vinyl acetate resin (PVAc), an ionomer (IO), polymethylpentene (TPX), vinylidene chloride (PVDC), polysulfone (PSF), polyvinylidene fluoride (PVDF), a methacrylate-styrene copolymer resin (MS), polyarylate (PAR), polyarylsulfone (PASF), polybutadiene (BR), polyethersulfone (PESF), and polyetheretherketone (PEEK). Of those, an ethylene vinyl acetate copolymer (EVA) and polyvinyl butyral (PVB) are particularly preferred because adhesiveness with sheet glass can be easily enhanced and the glass fragments of sheet glass can be effectively prevented from scattering.

The reason why an ethylene vinyl acetate copolymer (EVA) and polyvinyl butyral (PVB) are particularly preferred is as follows. The laminated glass of the present invention is produced so as to include glass layers having a small thickness placed in its transparent surfaces and in the vicinity thereof (laminated region). This leads to smaller glass fragments generated at the time of breakage. Further, the contact area with the adhesion layer per unit mass of glass fragments increases, and the glass fragments are unlikely to detach from the adhesion layer, resulting in the reduction in the amount of scattered glass fragments. All of them contribute to the prevention of a cut wound and a bruise caused by the glass fragments. Thermoplastic resins are heated and pressured to easily realize high adhesiveness with glass. Of thermoplastic resins, polyvinyl butyral (PVB) and an ethylene vinyl acetate copolymer (EVA) are useful from the above point of view.

Engulfed bubbles produced during the attachment of glass and a resin cause a visual problem, and moreover, serve as partially non-adhesive portions, which may inhibit the prevention of glass fragments from spreading and scattering in some cases. Thermoplastic resins are also useful for avoiding the problem of bubble inclusion, because the thermoplastic resins absorb gases in the bubbles by being heated and pressured, contributing to bubble elimination. The above-mentioned polyvinyl butyral (PVB) and ethylene vinyl acetate copolymer (EVA) are significantly effective in this respect as well.

In the laminated glass of the present invention, the laminated structure in the transparent surfaces and in the vicinity thereof (laminated region) prevents glass fragments generated in the region (deep portion) more inner than the transparent surfaces and the vicinity thereof from projecting into the transparent surfaces and from scattering outside. When the laminated structure in the laminated region has a structure in which glass fragments generated in the deep portion easily penetrate, the prevention of the glass fragments generated in the deep portion from sticking out of the transparent surfaces and from scattering is not sufficiently achieved. In order to provide the laminated structure in which the glass fragments generated in the deep portion are unlikely to penetrate into the transparent surfaces, it is preferred that a structure in which the glass layers in the laminated region firmly adhere to the adhesion layers be provided. The thermoplastic resins exemplified above are preferred for providing the above laminated structure because the thermoplastic resins indicate a powerful adhesive force. Of those, polyvinyl butyral (PVB) and an ethylene vinyl acetate copolymer (EVA) are particularly preferred.

In contrast, hard resins such as polycarbonate and a polyimide resin have higher hardness and lower adhesiveness with glass. When one of those hard resins is used alone for the adhesion layer of the present invention, the adhesion with the glass layer becomes difficult, resulting in causing a problem in the prevention of glass fragments from scattering in some cases. However, if the adhesion layer is produced in such a structure that one of those hard resins is mixed with or overlapped with an ethylene vinyl acetate copolymer (EVA) or the like, the above problem can be avoided. Alternatively, its surface may be modified. When a hard resin can be used while the problem with adhesion is avoided, a benefit of the penetration resistance of the hard resin can be provided, and the prevention of glass fragments in a deep portion from scattering can be effectively carried out.

Various methods can be used as a method of forming a laminated glass by sandwiching a thermoplastic resin between sheet glasses. Examples thereof include a method involving sandwiching, between sheet glasses, a resin material obtained by preliminarily molding into a sheet and subjecting the resultant to thermal compression bonding, and a method involving passing a thermoplastic resin between preliminarily laminated sheet glasses.

It is preferred that the amount of glass fragments of the laminated glass of the present invention generated by a ball drop test according to JIS R3205 (2005) be 0.1 $cm^3$/piece or less in addition to the above, because the glass fragments are not scattered in a large amount even when the laminated glass is destroyed, with the result that a risk leading to a serious disaster can be alleviated.

Here, the ball drop test is specifically described. JIS R3205 (2005) used for evaluating the present invention is according to "a test method for a ball drop test" provided in section 7.6 in Japanese Industrial Standard, JIS R3205 "laminated glass" issued in 2005. In the test, a laminated glass with transparent surfaces and measuring about 610×610 mm is prepared, and a steel ball with a mass of 1,040 g that is provided in JIS B1501 is allowed to fall on the laminated glass. The position from which the steel ball is allowed to fall is set to a location that is within 25 mm from the center of the transparent surface of the laminated glass serving as a test sample. The ball dropping operation is carried out once from each of the heights of 120 cm, 150 cm, 190 cm, 240 cm, 300 cm, 380 cm, and 480 cm, with the heights being raised in the stated order. After the series of the operation, that is, after the dropping of the steel ball of 1,040 g, a steel ball with a mass of 2,260 g that is provided in JIS B1501 is allowed to fall from the height of 480 cm. After the above series of the operations, the total amount of scattered glass fragments generated by the collision of each of the falling balls is measured. As a result, the value of the laminated glass of the present invention is found to be 0.1 $cm^3$/piece or less.

It is not preferred that the amount of the glass fragments generated in the ball drop test be more than 0.1 $cm^3$/piece, because a large number of glass fragments are generated, resulting in an unignorable risk of a cut wound caused by the glass fragments.

It is not preferred that the amount of the glass fragments generated in the ball drop test according to the present invention be more than 0.1 $cm^3$/piece, because an unignorable risk of a cut wound is caused by the glass fragments.

When the laminated glass of the present invention is used as a member for a water environment, in addition to the above, skin not protected, for example, by clothes may be less exposed to a risk.

Here, the term "member for a water environment" refers to a member used in the house and probably touching the skin, such as a member for a bath wall, shower booth wall, bath door, bathtub, bath counter, bathtub apron portion, partition plate for a bathroom, wash counter, washbowl, or kitchen sink.

A laminated glass member of the present invention is characterized in that the laminated glass having the above-mentioned structure is fixed in a frame. With the structure, the laminated glass member can be installed in buildings or the like in consideration of various building styles.

The laminated glass member of the present invention may have the transparent surface coated with a film formed of a material different from that used for the adhesion layer. Any kind of film may be appropriately selected for adjusting a variety of characteristics such as optical characteristics like a transmittance and a refractive index, surface hardness, surface conductivity, and humidity resistance.

As a surface film of the present invention, for example, there can be used a film having a composition of silica ($SiO_2$), alumina ($Al_2O_3$), zirconia ($ZrO_2$), tantalum oxide (or tantala) ($Ta_2O_5$), niobium oxide ($Nb_2O_5$), lanthanum oxide ($La_2O_3$), yttrium oxide ($Y_2O_3$), magnesium oxide (MgO), hafnium oxide ($HfO_2$), chromium oxide ($Cr_2O_3$), magnesium fluoride ($MgF_2$), molybdenum oxide ($MoO_3$), tungsten oxide ($WO_3$), cerium oxide ($CeO_2$), vanadium oxide ($VO_2$), titanium zirconium oxide ($ZrTiO_4$), zinc sulfide (ZnS), cryolite ($Na_3AlF_6$), chiolite ($Na_5Al_3F_{14}$), yttrium fluoride ($YF_3$), calcium fluoride ($CaF_2$), aluminum fluoride ($AlF_3$), barium fluoride ($BaF_2$), lithium fluoride (LiF), lanthanum fluoride ($LaF_3$), gadolinium fluoride ($GdF_3$), dysprosium fluoride ($DyF_3$), lead fluoride ($PbF_3$), strontium fluoride ($SrF_2$), an antimony-containing tin oxide (ATO) film, an indium oxide-tin film (ITO film), a multilayer film of $SiO_2$ and $Al_2O_3$, an SiOx-TiOx-based multilayer film, an $SiO_2$—$Ta_2O_5$-based multilayer film, an SiOx-LaOx-TiOx-based multilayer film, an $In_2O_3$—$Y_2O_3$ solid solution film, an alumina solid solution film, a metal thin film, a colloid particle-dispersed film, a polymethyl methacrylate film (PMMA film), a polycarbonate film (PC film), a polystyrene film, a methyl methacrylate-styrene copolymer film, a polyacrylate film, or the like.

Examples of the surface film of the present invention include, in terms of film properties, an antireflection film (which is also referred to as an AR coat), an infrared reflection film (or infrared cut filter), a non-reflection film, a conductive film, an antistatic film, a low-pass filter, a high-pass filter, a band-pass filter, a shield film, a reinforced film, and a protective film. Any manner of applying a film is employed. When both of front and back transparent surfaces are coated with films, the kind of the coated films may be the same or different. Different kinds of films may be laminated on the same surface. The laminated number of the films is not restricted.

Any method of forming the film can be employed as long as the method can realize a predetermined surface accuracy and function. Examples thereof include a sputtering method, a vacuum vapor deposition method, chemical vapor deposition methods (or CVD methods) such as a thermal CVD method, a laser CVD method, a plasma CVD method, a molecular beam epitaxy method (MBE method), an ion plating method, a laser abrasion method, and a metal organic chemical vapor deposition method (MOCVD), and liquid phase deposition methods such as a sol-gel method, a coating method for spin coating or screen printing, and a plating method. Of those, the CVD method is preferred because the CVD method enables a coated film with good adhesion to be formed at a low temperature, is adaptable to various films, and is suitable for forming a film of a compound.

Effects of the Invention

The laminated glass of the present invention has the above-mentioned structure, and hence, the laminated glass is safe because, even when the laminated glass is broken, glass fragments are small and scatter in small amount, with the result that a cut wound and a bruise are unlikely to be caused.

Further, even when destroyed portions of glass such as a penetration hole are produced, the risk of being cut with destroyed glass remarkably lowers.

The laminated glass member of the present invention is obtained by fixing the above-mentioned laminated glass in a frame, and hence, the laminated glass member is easy to install on various buildings and is good at handling performance. The fixing in a frame is effective for protecting the edge surface of the laminated glass, which is unlikely to break during transportation.

BEST MODE FOR CARRYING OUT THE INVENTION

Hereinafter, details are specifically given about a laminated glass according to embodiments of the present invention and a laminated glass member using the laminated glass.

FIG. 1A shows a transparent surface and its vicinity region of a laminated glass 11 of Embodiment 1, and FIG. 1B shows a transparent surface and its vicinity region of a laminated glass 12 of Embodiment 2.

In the laminated glass 11 shown in FIG. 1A, the laminated region with a depth of 4.0 mm from the transparent surface 11a is constituted of two glass layers with a thickness of 0.5 mm and being formed of a sheet glass 20, a glass layer with a thickness of 0.6 mm and being formed of a part 20a of the sheet glass 20, the part 20a being positioned in the above laminated region, and two adhesion layers each having a thickness of 1.6 mm and a thickness of 0.8 mm and being sandwiched between those glass layers to adhere to the glass layers firmly. As is described above, the sheet glass 20 forming the glass layer 20a positioned on the innermost layer side in the above laminated region has a thickness of 3.0 mm, and the end of inner layer side of the sheet glass 20 is positioned on a more inner side than the boundary of the above laminated region (position at the depth of 4.0 mm). Further, the transparent surface 11a is formed of a glass layer (sheet glass 20) positioned on the outermost layer side in the above laminated region.

In the laminated glass 12 shown in FIG. 1B, the laminated region with a depth of 4.0 mm from the transparent surface 12a is constituted of three glass layers with thicknesses of 0.7 mm, 0.5 mm, and 0.7 mm respectively, which are formed of the sheet glass 20, and two adhesion layers 30 with a thickness of 0.8 mm, which are sandwiched between those glass layers to adhere to the glass layers firmly. An adhesion layer 30 with a thickness of 0.8 mm forms the innermost layer of the above laminated region, and firmly adheres to the end of the inner layer side of the glass layer 20 positioned on the outermost layer side in the above laminated region. Further, the transparent surface 12a is formed of a glass layer (sheet glass 20) positioned on the outermost layer side in the above laminated region. It should be noted that in Embodiment 2, the end of the inner layer side of the adhesion layer 30 in the innermost layer is positioned in a more inner side than the boundary of the above laminated region (position at the depth of 4.0 mm), but the end of inner diameter side of the adhesion layer 30 may be positioned on the boundary of the above laminated region (position at the depth of 4.0 mm).

FIG. 3 illustrates a laminated glass 10 of Embodiment 3.

The laminated glass 10 of Embodiment 3 is used for a window panel material for, for example, a high-rise building which is 10 or more storied. The size of the transparent surfaces 10a and 10b is 1,000 mm by 1,500 mm. The laminated glass 10 has seven laminated alkali-free sheet glasses 20 and the transparent surfaces 10a and 10b are each formed of the sheet glass 20. The glass composition of each sheet glass 20 is 60% or more of $SiO_2+B_2O_3$, 5 to 20% of $Al_2O_3$, 2 to 30% of RO (R=Mg+Ca+Sr+Ba+Zn), and 1% or less of $Na_2O+K_2O+Li_2O$ expressed by mass %. The thickness of the sheet glass 20 is 0.7 mm, 0.7 mm, 1.5 mm, 0.15 mm, 1.5 mm, 0.7 mm, and 0.7 mm in the order starting from the transparent surface 10a on one side. Six PVB resins are used as adhesion layers 30 interposing between the sheet glasses 20. The thickness of the resin 30 as the adhesion layer is 1.3 mm, 0.5 mm, 0.5 mm, 0.5 mm, 0.5 mm, and 1.3 mm in the order starting from the transparent surface 10a on one side.

As described above, the laminated glass 10 has such a structure as laminating seven sheet glasses 20 and six PVB resins 30 alternately, and the total thickness of the laminated glass 10 is 10.55 mm. Further, the laminated region which is from the transparent surface 10a on one side to the depth of 4.0 mm is constituted of two glass layers each having a thickness of 0.7 mm and being formed of two sheet glasses 20, one glass layer having a thickness of 0.8 mm and being formed of a part 20c of one sheet glass 20 having a thickness of 1.5 mm, the part 20c being positioned in the above laminated region, and two adhesion layers 30 each having a thickness of 1.3 mm and a thickness of 0.5 mm and being sandwiched between those glass layers to adhere to the glass layers firmly. The total thickness of three glass layers in the above laminated region is 0.7 mm+0.7 mm+0.8 mm=2.2 mm. The thickness of the glass layer 20 positioned on the outermost layer side in the above laminated region is 0.7 mm. The thickness of the glass layer 20c positioned on the innermost layer side in the above laminated region is 0.8 mm. Thus, the laminated glass 10 satisfies the condition of 2.2 mm−(0.7 mm+0.8 mm)=0.7 mm≧0.5 mm. A laminated region from the transparent surface 10b on the other side to the depth of 4.0 mm has the same laminated structure as that of the above laminated region.

In addition, the laminated glass 10 is symmetrical between the front side and the back side with respect to the central surface of the laminated glass 10 along the thickness in the laminated region of the front and back transparent surfaces 10a and 10b, and moreover, the laminated structure in other regions is also symmetrical. That is, the laminated glass 10 entirely has a laminated structure symmetrical to the plane at the mid-depth, with its front and back surfaces being indistinguishable.

Because the laminated glass 10 has such a structure, the laminated glass can be used without distinguishing its front and back surfaces when the installment of the laminated glass is carried out. Further, the laminated glass 10 is highly safe, because the laminated glass can exhibit mechanical performance such as a high penetration resistance, and when destruction force beyond the durability of the laminated glass is applied, the laminated glass breaks, but the scattered glass fragments is very low in amount.

The laminated glass 10 can be produced, for example, in the following manner. First, homogeneously melt alkali-free glass is preliminarily formed into a sheet with a predetermined thickness by a downroad forming or the like, to thereby obtain a parent sheet glass. Next, the parent sheet glass is cut to obtain a sheet glass 20 with a predetermined size. Any known cutting method may be used, and the examples of the method include laser cutting, diamond wheel cutting, and cutting using loose abrasive grains. While the sheet glass is prepared, a sheet material made of a PVB resin with a predetermined size is also prepared. After that, the sheet glass and the resin are alternately laminated, followed by thermal compression bonding, to give a laminated glass.

EXAMPLE 1

The performance evaluation test conducted with respect to the laminated glass in terms of examples are hereinafter described.

Any of the sheet glasses used as samples for examples is an alkali-free glass sheet formed by an overflow downdraw method, and specifically is a thin sheet glass manufactured by Nippon Electric Glass Co., Ltd. (article code of glass material: OA-10). The thickness of the sheet glass is 0.7 mm and the plane size of the sheet glass was set to 610 mm×610 mm.

Evaluation was performed based on a ball drop test according to JIS R3205 to measure the amount and size of scattered glass fragments that was generated when the laminated glass was destroyed. A steal ball according to JIS B1501 was used for a ball to fall. The position from which the steel ball was allowed to fall freely onto the sample was set to the location that was within 25 mm from the center of transparent surface of the sample measuring 610 mm per side. The sample was fixed horizontally to a metal frame made of iron. In the falling ball operation, a steel ball of 1,040 g was allowed to fall once from each of the heights of 120 cm, 150 cm, 190 cm, 240 cm, 300 cm, 380 cm, and 480 cm, with the heights being raised in the stated order. After the series of the ball dropping operations using the steel ball of 1,040 g, a steel ball of 2,260 g was allowed to fall from the height of 480 cm. After the above series of the ball dropping operations of steal balls, a sample was measured for the total amount of scattered glass fragments. In the measurement, the mass of the scattered glass fragments was measured by a calibrated mass measuring instrument, and the obtained mass was converted to a volume by using the density of the glass. The shape of the scattered glass fragments generated was observed and the maximum size of the broken glass was measured. The features of appearance of the scattered glass fragments were observed visually to take a record. Table 1 collectively shows the evaluation results of the series of tests.

TABLE 1

| | | | Example | | | | | Comparative Example | |
|---|---|---|---|---|---|---|---|---|---|
| | Sample No. | | 1 | 2 | 3 | 4 | 5 | 101 | 102 |
| Structure of laminated glass | Sheet glass | Material | OA-10 | OA-10 | OA-10 | OA-10 | OA-10 | Soda glass sheet | Soda glass sheet |
| | | Thickness per sheet glass (mm) | 0.7 | 0.7 | 0.7 | 0.7 | 0.7 | 3.0 | 3.0 |
| | | Number of layers | 6 | 8 | 6 | 8 | 10 | 1 | 2 |
| | Adhesive layer | Material of adhesive layer | PVB | EVA | PVB | PVB | PVB | — | PVB |
| | | Thickness per adhesive layer (mm) | 0.8 | 0.3 | 0.4 | 0.4 | 0.8 | — | 1.5 |
| | | Number of layers | 5 | 7 | 5 | 7 | 9 | — | 1 |
| | Total thickness of layers of sheet glass from transparent surface to depth of 4 mm: Z (mm) | | 2.1 | 2.8 | 2.8 | 2.8 | 2.1 | — | 3.0 |
| | Sum of thickness of outermost sheet glass and thickness of sheet glass positioned at depth of 4 mm from surface of laminated glass: K (mm) | | 0.7 | 0.7 | 0.7 | 0.7 | 0.7 | — | 3.0 |
| | Z − K (mm) | | 1.4 | 2.1 | 2.1 | 2.1 | 1.4 | — | 0 |
| Evaluation of scattering extent of sheet glass during ball drop test | Amount of scattered glass | Total weight (g/piece) | 0.03 | 0.03 | 0.02 | 0.03 | 0.02 | 1,620 | 39 |
| | | Total volume (cm³/piece) | 0.01 | 0.01 | 0.01 | 0.01 | 0.01 | 650 | 16 |
| | Shape of scattered glass | Maximum size (mm/piece) | 1 | 3 | 2 | 3 | 2 | 150 | 35 |
| | | Shape of appearance | Powdery | Powdery | Powdery | Powdery | Powdery | Substantially triangular | Rectangular, Substantially triangular |

| | | | Comparative Example | | |
|---|---|---|---|---|---|
| | Sample No. | | 103 | 104 | 105 |
| Structure of laminated glass | Sheet glass | Material | Soda glass sheet | Soda glass sheet | Tempered glass | Soda glass sheet |
| | | Thickness per sheet glass (mm) | 3.0 | 3.0 | 7.0 | 3.0 |
| | | Number of layers | 2 | 2 | 1 | 1 |
| | Adhesive layer | Material of adhesive layer | PVB | PC | PVB | |
| | | Thickness per adhesive layer (mm) | 2.3 | 1.2 | 1.5 | |
| | | Number of layers | 1 | 1 | 1 | |
| | Total thickness of layers of sheet glass from transparent surface to depth of 4 mm: Z (mm) | | 3.0 | 3.0 | 3.0 | |
| | Sum of thickness of outermost sheet glass and thickness of | | 3.0 | 3.0 | 3.0 | |

TABLE 1-continued

|  |  | sheet glass positioned at depth of 4 mm from surface of laminated glass: K (mm) |  |  |  |
|---|---|---|---|---|---|
|  |  | Z − K (mm) | 0 | 0 | 0 |
| Evaluation of scattering extent of sheet glass during ball drop test | Amount of scattered glass | Total weight (g/piece) | 39 | 56 | 37 |
|  |  | Total volume (cm³/piece) | 16 | 22 | 15 |
|  | Shape of scattered glass | Maximum size (mm/piece) | 45 | 35 | 20 |
|  |  | Shape of appearance | Rectangular, Substantially triangular | Rectangular, Substantially triangular | Substantially wedge-shaped |

As shown in Table 1, sample No. 1 as an example of the present invention is one obtained by laminating six alkali-free glass sheets (OA-10) with a thickness of 0.7 mm and sandwiching PVB resins (PVB concentration: 99 mass % or more) with a thickness of 0.8 mm between respective sheet glasses to adhere firmly with each other. The laminated structure in the laminated region with a depth of 4.0 mm from the transparent surface is according to the laminated glass 12 illustrated in FIG. 1B. That is, the total value of thickness of all glass layers in the above laminated region (value of total thickness Z shown in Table 1) is Z=0.7 mm+0.7 mm+0.7 mm=2.1 mm, and the thickness of the glass layer positioned on the outermost layer side in the above laminated region is 0.7 mm (value of the sum K shown in Table 1: the thickness of the glass layer positioned on the innermost layer side in the above laminated region is not included), i.e., K=0.7 mm+0 mm=0.7 mm. Thus, the laminated glass of the sample No. 1 satisfies the condition of Z−K=2.1 mm−(0.7 mm+0 mm)=1.4 mm≧0.5 mm.

For the sample No. 1, the total mass of the scattered glass fragments generated in the above-mentioned ball drop test was as very small as 0.03 g, with a conversion to a volume of 0.01 cm³. Further, the shape of the scattered glass fragments generated in the ball drop test was powdery and the maximum size of the glass fragments was 1 mm. The above-mentioned results show that the laminated glass of sample No. 1 does not cause a cut wound and a bruise to a human body with its scattered glass fragments even if the laminated glass is broken.

Sample No. 2 as an example of the present invention is one obtained by laminating eight alkali-free glass sheets (OA-10) with a thickness of 0.7 mm and sandwiching EVA resins with a thickness of 0.3 mm between respective sheet glasses to adhere firmly with each other. The laminated structure in the laminated region with a depth of 4.0 mm from the transparent surface is according to the laminated glass 12 illustrated in FIG. 1B. It should be noted that the end of the inner layer side of the EVA resin forming the innermost layer in the above laminated region is positioned at the above depth of 4.0 mm. The laminated glass of sample No. 2 thus satisfies the conditions of total thickness Z=0.7 mm+0.7 mm+0.7 mm+0.7 mm=2.8 mm, of sum K=0.7 mm+0 mm=0.7 mm, and of Z−K=2.8 mm−0.7 mm=2.1 mm≧0.5 mm.

For the sample No. 2, the total mass of the scattered glass fragments generated in the above-mentioned ball drop test was as very small as 0.03 g, with a conversion to a volume of 0.01 cm³. Further, the shape of the scattered glass fragments was powdery and the maximum size of the glass fragments was 3 mm. The above-mentioned results show that the laminated glass of sample No. 2 does not cause a cut wound and a bruise to a human body with its scattered glass fragments even if the laminated glass is broken as in the case of the sample No. 1.

Sample No. 3 as an example of the present invention is one obtained by laminating six alkali-free glass sheets (OA-10) having a thickness of 0.7 mm and sandwiching PVB resins with a thickness of 0.4 mm between respective sheet glasses to adhere firmly with each other. The laminated structure in the laminated region with a depth of 4.0 mm from the transparent surface is according to the laminated glass 12 illustrated in FIG. 1B. It should be noted that the end of the inner layer side of the glass layer (sheet glass) forming the innermost layer in the above laminated region is positioned at the above depth of 4.0 mm. The laminated glass of sample No. 3 thus satisfies the conditions of total thickness Z=0.7 mm+0.7 mm+0.7 mm+0.7 mm=2.8 mm, of sum K=0.7 mm+0 mm=0.7 mm, and of Z−K=2.8 mm−0.7 mm=2.1 mm≧0.5 mm.

For the sample No. 3, the total mass of the scattered glass fragments generated in the above-mentioned ball drop test was as very small as 0.02 g, with a conversion to a volume of 0.01 cm³. The above-mentioned results show that the laminated glass of sample No. 3 as the laminated glass of the present invention does not cause a cut wound and a bruise to a human body with its scattered glass fragments even if the laminated glass is broken as in the case of the sample No. 1.

Sample No. 4 as an example of the present invention is one obtained by laminating eight alkali-free glass sheets (OA-10) with a thickness of 0.7 mm and sandwiching PVB resins with a thickness of 0.4 mm between respective sheet glasses to adhere firmly with each other. The laminated structure and the value (Z−K) in the laminated region with a depth of 4.0 mm from the transparent surface are the same as in the sample No. 3.

For the sample No. 4, the total mass of the scattered glass fragments generated in the above-mentioned ball drop test was as very small as 0.03 g, with a conversion to a volume of 0.01 cm³. The above-mentioned results show that the laminated glass of sample No. 4 does not cause a cut wound and a bruise to a human body with its scattered glass fragments even if the laminated glass is broken.

Sample No. 5 as an example of the present invention is one obtained by laminating ten alkali-free glass sheets (OA-10) with a thickness of 0.7 mm and sandwiching PVB resins with a thickness of 0.4 mm between respective sheet glasses to adhere firmly with each other. The laminated structure and the value (Z−K) in the laminated region with a depth of 4.0 mm from the transparent surface are the same as in the sample No. 1.

For the sample No. 5, the total mass of the scattered glass fragments generated in the above-mentioned ball drop test was as very small as 0.02 g, with a conversion to a volume of 0.01 cm³. The above-mentioned results show that the laminated glass of sample No. 5 does not cause a cut wound and a bruise to a human body with its scattered glass fragments even if the laminated glass is broken as in the case of the sample No. 1.

Next, evaluation results or the like for comparative examples of the present invention are hereinafter shown. Sample No. 101 of a comparative example is a window panel for a building such as an ordinary house, which is a single sheet made of soda-lime glass with a thickness of 3 mm. A ball drop test was conducted for the sample No. 101 in the same manner as described above. As a result, a large amounts of scattered glass fragments were generated. The total mass of the glass fragments was 1,620 g, being converted to 650 cm³ in volume. In addition, the scattered glass fragments were very large, including one having a maximum size of as large as 150 mm, and were each substantially triangular in shape and sharp. The results show that when the sample No. 101 of the comparative example is broken, scattered glass fragments may have a risk of causing a cut wound and a bruise to a human body.

Sample No. 102 of a comparative example is a commercially available laminated glass, which is obtained by sandwiching a PVB resin layer having a thickness of 1.5 mm between two soda-lime sheet glasses with a thickness of 3 mm. A falling ball test was conducted for the sample No. 102 in the same manner as described above. As a result, many scattered glass fragments were generated. The total mass of the glass fragments was 39 g, which is converted to 16 cm³ in volume. In addition, the scattered glass fragments were very large, including one with a maximum size of 35 mm, and were rectangular or substantially triangular in shape. The results show that when the sample No. 102 of the comparative example is broken, scattered glass fragments may have a risk of causing a cut wound and a bruise to a human body.

Sample No. 103 of a comparative example is a commercially available laminated glass similar to the sample No. 102, and is obtained by sandwiching a PVB resin layer with a thickness of 2.3 mm between two soda-lime sheet glasses with a thickness of 3 mm. A ball drop test was conducted for the sample No. 103 in the same manner as described above. As a result, many scattered glass fragments were generated. The total mass of the glass fragments was 39 g, which is converted to 16 cm³ in volume. In addition, the scattered glass fragments were very large, including one with a maximum size of 45 mm, and were rectangular or substantially triangular in shape. The results show that when the sample No. 103 of the comparative example is broken, scattered glass fragments may have a risk of causing a cut wound and a bruise to a human body.

Sample No. 104 of a comparative example is a commercially available laminated glass similar to the sample No. 102, and is obtained by sandwiching a PC resin layer with a thickness of 1.2 mm between two soda-lime glasses with a thickness of 3 mm. A ball drop test was conducted for the sample No. 104 in the same manner as described above. As a result, many scattered glass fragments were generated. The total mass of the glass fragments was 56 g, which is converted to 22 cm³ in volume. In addition, the scattered glass fragments were very large, including one with a maximum size of 35 mm, and were rectangular or substantially triangular in shape. The results show that when the sample No. 104 of the comparative example is broken, scattered glass fragments may have a risk of causing a cut wound and a bruise to a human body.

Sample No. 105 of a comparative example is a commercially available laminated glass, which is obtained by sandwiching a PVB resin layer with a thickness of 1.5 mm between a tempered glass having a thickness of 7 mm and a soda-lime glass with a thickness of 3 mm. A ball drop test was conducted for the sample No. 105 in the same manner as described above. As a result, many scattered glass fragments were generated. The total mass of the glass fragments was 37 g, which is converted to 20 cm³ in volume. In addition, the scattered glass fragments were very large, including one with a maximum size of 20 mm. The results show that when the sample No. 105 of the comparative example is broken, scattered glass fragments may have a risk of causing a cut wound and a bruise to a human body.

The results of the above performance evaluation tests has confirmed that the laminated glass of the examples has high durability against penetration force or the like, and moreover, scattered glass fragments generated at the time of its breakage are small in size and, further, are small in amount. Thus, it has been clarified that the laminated glass of the examples is low in risk leading to a cut wound disaster, and hence is a safe structure.

EXAMPLE 2

Next, an example of a laminated glass member using the laminated glass of the present invention is described.

FIG. 4 illustrates a mode of a laminated glass member according to an example. The glass member is for balcony windows of upper floors of condominiums or the like, and has a structure in which a laminated glass 13 is fitted into a window frame 90 made of aluminum. The window frame 90 is provided with grooves for sandwiching a laminated glass for a holding purpose in its inner circumference. The laminated glass 13 is produced by sandwiching EVA resin layers 30 with a thickness of 1.1 mm between four sheet glasses 20 with a thickness of 0.9 mm. Each of front and back transparent surfaces is formed of a sheet glass 20, and a quartz glass sheet made of alkali-free glass and an OA-10 glass sheet are arranged alternately as four sheet glasses 20. The EVA resin layers 30 sandwiched between the sheets glasses 20 are subjected to thermal compression bonding to adhere to the sheet glasses 20 firmly.

In the laminated glass 13, the laminated region with a depth of 4.0 mm from one of the transparent surfaces 13a is constituted of a sheet glass 20 (glass layer), an EVA resin layer 30, a sheet glass 20 (glass layer), and an EVA resin layer 30 in the stated order from the side of the transparent surface 13, and the end of the inner layer side of the innermost EVA resin layer 30 is located on the boundary of the above laminated region (position at the depth of 4.0 mm). Thus, the total value of thicknesses of all glass layers in the above laminated region comes to 0.9 mm+0.9 mm=1.8 mm, and the thickness of the glass layer positioned on the outermost layer side in the above laminated region is 0.9 mm (the thickness of the glass layer positioned on the innermost layer side in the above laminated region is not included). As a result, the laminated glass 13 satisfies the condition of 1.8 mm−(0.9 mm+0 mm)=0.9 mm≧0.5 mm.

EXAMPLE 3

Further, described is an example in which a laminated glass member of the present invention is used as a window member for a bathroom.

FIG. 5 illustrates a partial perspective view of a bathroom. A laminated glass member 110 of the example is used as a window member on each of two walls contacting a bathtub. Window glass breakage in a bathroom probably leads to a serious cut wound disaster. Thus, it is important for a window member used in a bathroom to have transparency for collecting light and, besides, to meet the requirement for safety to a cut wound. The laminated glass member 110 of the example satisfies those conditions, and is highly worth being used as a member for a water environment to be used in a place where people take off their clothes, such as a window member for a bathroom and a member for a shower booth. Here, each of laminated glasses 14 is fitted in a frame 90 made of aluminum, and the frame 90 is fixed and retained on a surrounding wall with screws.

The laminated glass 14 is produced by alternately laminating six aluminosilicate glass sheets with a thickness of 0.7 mm and polycarbonate (PC) resin sheets with a thickness of 0.8 mm. Its front and back transparent surfaces are each formed of a sheet glass. Each of the laminated regions with a depth of 4.0 mm from the transparent surface is constituted of a sheet glass, a PC resin layer, a sheet glass, a PC resin layer, a sheet glass, and a PC resin layer in the stated order from the side of the transparent surface, and the end of the inner layer side of the innermost PC resin layer is located more inner than the boundary of the laminated region (position at the depth of 4.0 mm). Thus, the total value of thicknesses of all glass layers in the above laminated region comes to 0.7 mm+0.7 mm+0.7 mm=2.1 mm, and the thickness of the glass layer positioned on the outermost layer side in the above laminated region is 0.9 mm (the thickness of the glass layer positioned on the innermost layer side in the above laminated region is not included). As a result, the laminated glass 14 satisfies the condition of 2.1 mm−(0.7 mm+0 mm)=1.4 mm≧0.5 mm.

Further, the transparent surface of the laminated glass member 110 is provided with a film of a polarizing sheet for shielding (not shown) on the side facing the outside of a bathroom, and hence, the inside of the bathroom is invisible from the outside of the bathroom, which is preferred from the viewpoint of protecting privacy.

As described above, the laminated glass member using the laminated glass of the present invention is high in safety, and moreover, can be employed in various construction forms in accordance with applications. The laminated glass member is therefore a superior construction that can find applications in many buildings and vehicle installation.

DESCRIPTION OF SYMBOLS

Figure 1A:
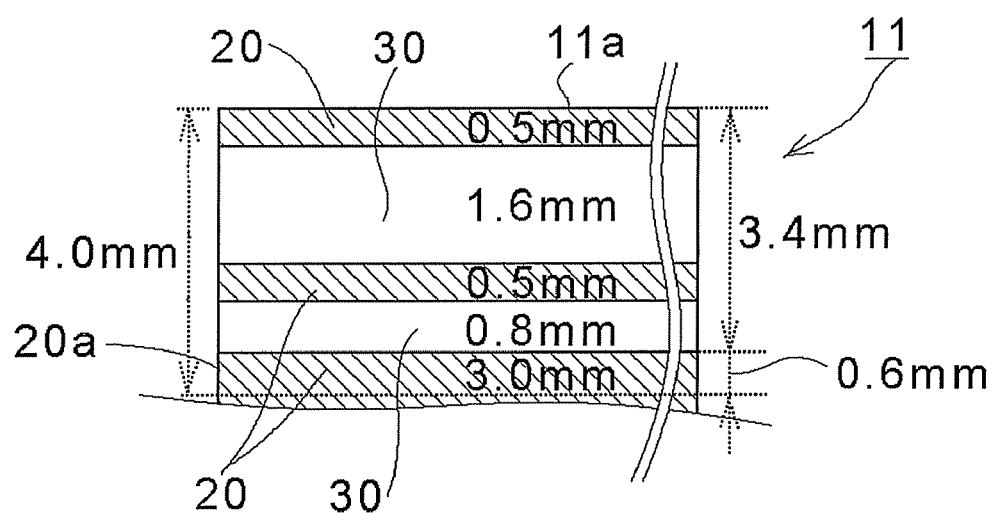
FIG. 1A a partial sectional view illustrating a transparent surface and its vicinity of a laminated glass of Embodiment 1.
Figure 1B:
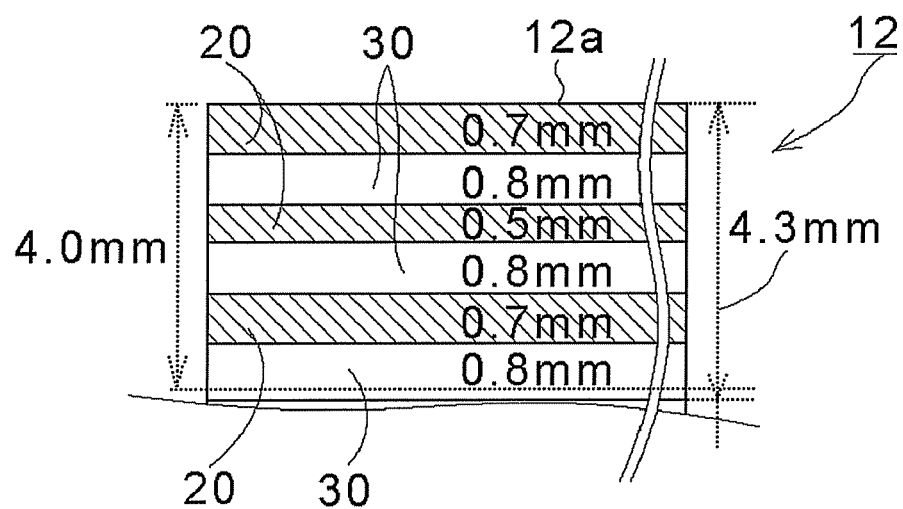
FIG. 1B is a partial sectional view illustrating a transparent surface and its vicinity of a laminated glass of Embodiment 2.
Figure 2A:
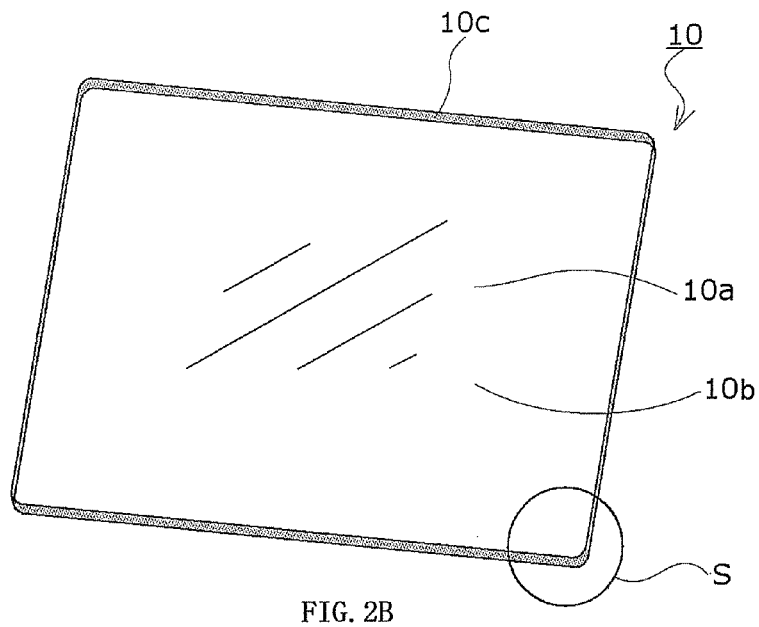
FIG. 2A is an overall perspective view illustrating a laminated glass of Embodiment 3.
Figure 2B:
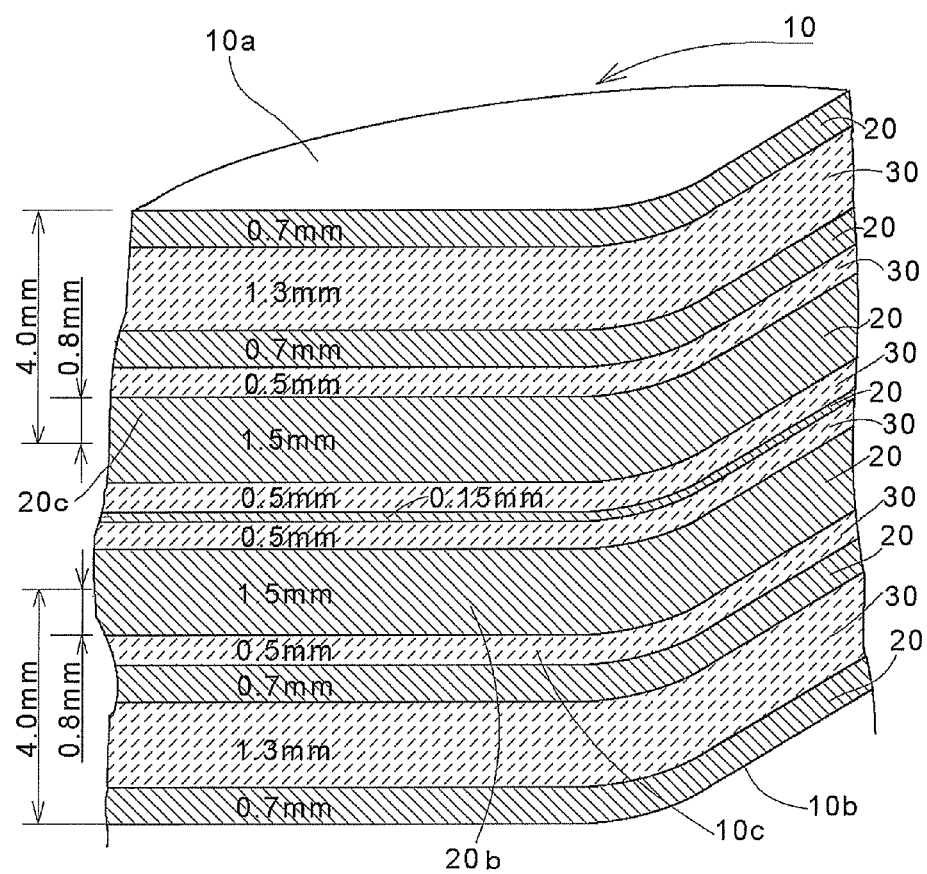
FIG. 2B is a partially enlarged perspective view of an S region of FIG. 2A.
Figure 3:
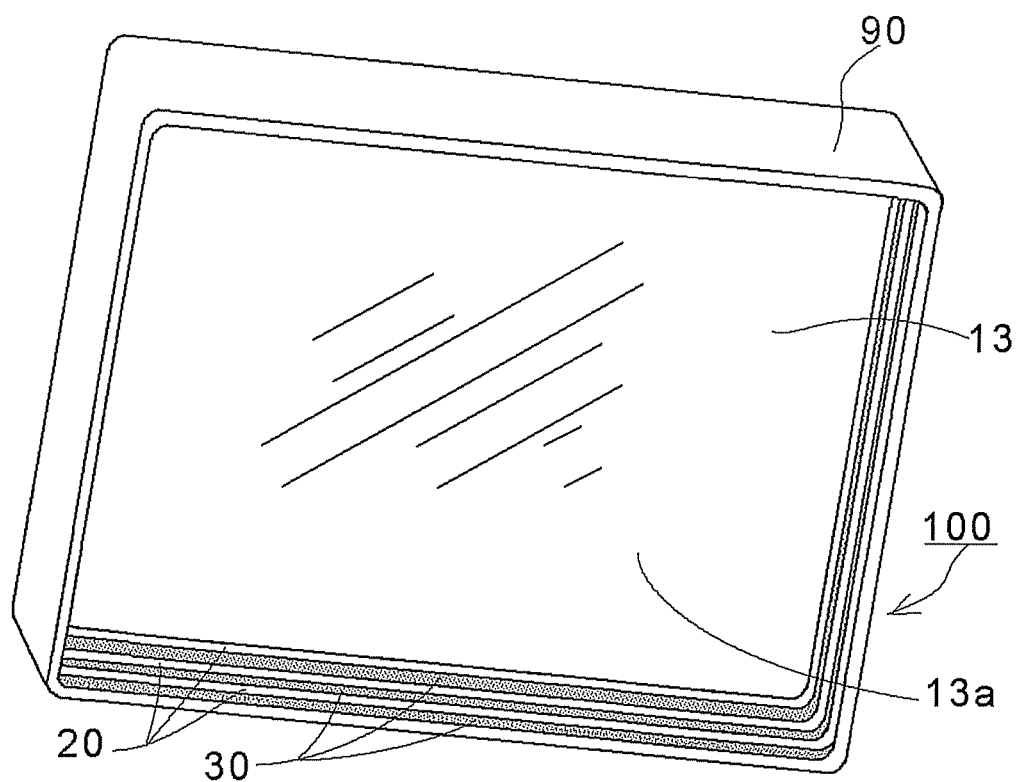
FIG. 3 is a perspective view of a laminated glass member according to an example.
Figure 4:
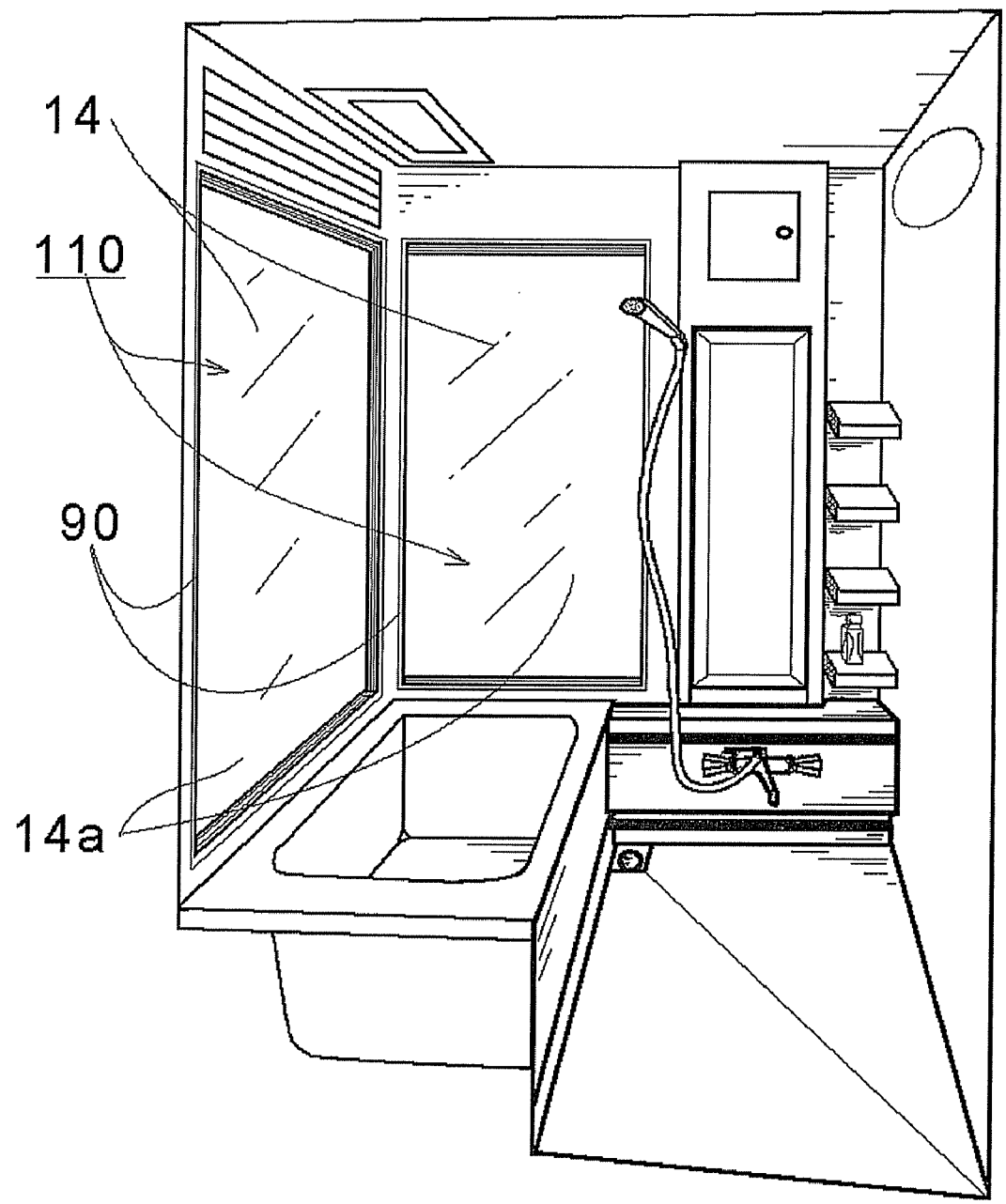
FIG. 4 is a partial perspective view of a bathroom in which the laminated glass member according to the example is installed.

10, 11, 12, 13, 14 laminated glass
10a, 11a, 12a, 13a, 14a transparent surface on one side
10b transparent surface on the other side
20 sheet glass
20b, 20c glass layer
30 adhesion layer (resin)

90 window frame
100, 110 laminated glass member

The invention claimed is:

1. A laminated glass, comprising:
   front and back transparent surfaces opposite to each other in a thickness direction of the laminated glass; and
   multiple glass layers and multiple adhesion layers being laminated alternately,
   wherein a laminated region with a depth of 4.0 mm from at least one of said front and back transparent surfaces includes multiple glass layers each having a thickness of less than 1.0 mm and being made of an alkali-free glass, and the laminated region also includes multiple adhesion layers.

2. The laminated glass according to claim 1, wherein the adhesion layers mainly contain a resin.

3. The laminated glass according to claim 2, wherein the resin in the adhesion layers comprises a thermoplastic resin.

4. The laminated glass according to claim 3, wherein a value which is obtained by subtracting, from a total value of thicknesses of all the glass layers in the laminated region, a thickness of the glass layer positioned toward an outermost layer side in the laminated region, and a thickness of the glass layer positioned toward an innermost layer side in the laminated region, provided that the glass layer toward the innermost layer side is formed of a part of one sheet glass, is 0.5 mm or more.

5. The laminated glass according to claim 3, wherein the front and back transparent surfaces are each formed of a glass layer.

6. The laminated glass according to claim 3, wherein the laminated glass has the laminated region at each of the front and back transparent surfaces.

7. The laminated glass according to claim 3, wherein an amount of glass fragments generated when a falling ball test according to JIS R3205 (2005) is carried out is 0.1 cm$^3$/piece or less.

8. A laminated glass member, comprising the laminated glass according to claim 3 and a frame in which the laminated glass is fixed.

9. The laminated glass according to claim 2, wherein a value which is obtained by subtracting, from a total value of thicknesses of all the glass layers in the laminated region, a thickness of the glass layer positioned toward an outermost layer side in the laminated region, and a thickness of the glass layer positioned toward an innermost layer side in the laminated region, provided that the glass layer toward the innermost layer side is formed of a part of one sheet glass, is 0.5 mm or more.

10. The laminated glass according to claim 2, wherein the front and back transparent surfaces are each formed of a glass layer.

11. The laminated glass according to claim 2, wherein the laminated glass has the laminated region at each of the front and back transparent surfaces.

12. The laminated glass according to claim 2, wherein an amount of glass fragments generated when a falling ball test according to JIS R3205 (2005) is carried out is 0.1 cm$^3$/piece or less.

13. A laminated glass member, comprising the laminated glass according to claim 2 and a frame in which the laminated glass is fixed.

14. The laminated glass according to claim 1, wherein a value which is obtained by subtracting, from a total value of thicknesses of all the glass layers in the laminated region, a thickness of the glass layer positioned toward an outermost layer side in the laminated region, and a thickness of the glass layer positioned toward an innermost layer side in the laminated region, provided that the glass layer toward the innermost layer side is formed of a part of one sheet glass, is 0.5 mm or more.

15. The laminated glass according to claim 1, wherein the front and back transparent surfaces are each formed of a glass layer.

16. The laminated glass according to claim 1, wherein the laminated glass has the laminated region at each of the front and back transparent surfaces.

17. The laminated glass according to claim 1, wherein an amount of glass fragments generated when a falling ball test according to JIS R3205 (2005) is carried out is 0.1 cm$^3$/piece or less.

18. The laminated glass according to claim 1, wherein the laminated glass is used as a member for a water environment.

19. A laminated glass member, comprising the laminated glass according to claim 1 and a frame in which the laminated glass is fixed.

20. The laminated glass member according to claim 19, wherein at least one of the front and back transparent surfaces is coated with a film made of a material different from that of the adhesion layers.

* * * * *